F. W. STANTON.
VAGINAL SYRINGE.
APPLICATION FILED JULY 11, 1919.
1,320,286.
Patented Oct. 28, 1919.
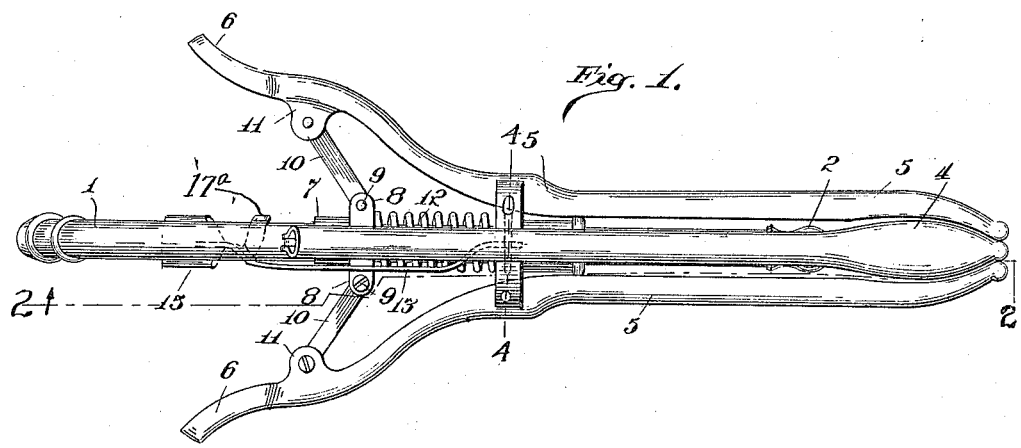
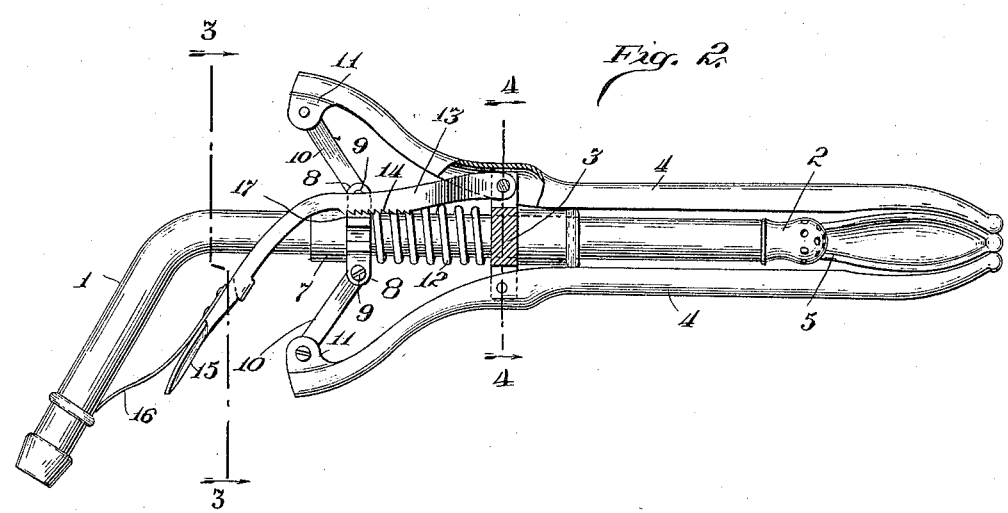
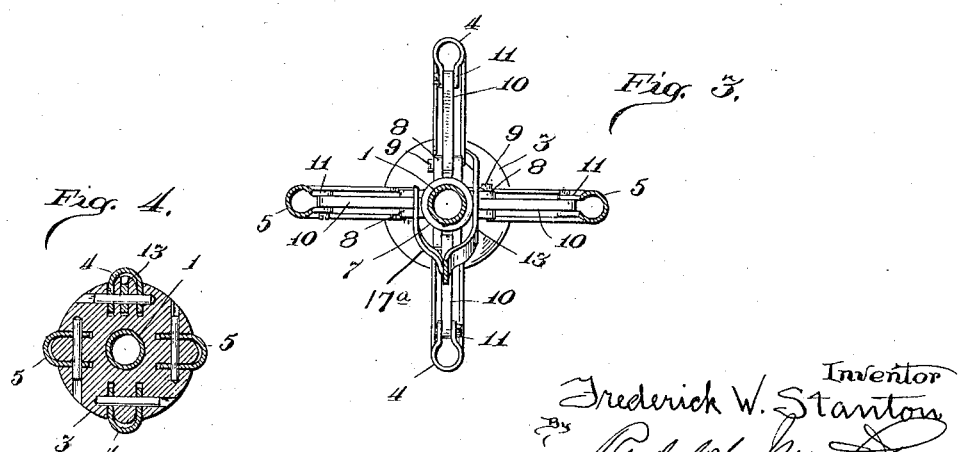
Inventor
Frederick W. Stanton
By Rudolph [?]
Attorney.

UNITED STATES PATENT OFFICE.

FREDERICK W. STANTON, OF CHICAGO, ILLINOIS.

VAGINAL SYRINGE.

1,320,286.  Specification of Letters Patent.  Patented Oct. 28, 1919.

Application filed July 11, 1919. Serial No. 310,218.

*To all whom it may concern:*

Be it known that I, FREDERICK W. STANTON, a citizen of the United States, residing at Chicago, in the county of Cook and State of Illinois, have invented certain new and useful Improvements in Vaginal Syringes; and I do hereby declare the following to be a full, clear, and exact description of the invention, such as will enable others skilled in the art to which it appertains to make and use the same.

This invention relates to improvements in vaginal syringes and more particularly in devices of this character which are equipped with means for effecting expansion of the vagina for thoroughly cleansing the same.

The present invention relates more particularly to means associated with the expansion devices of the syringe for maintaining the same expanded and the invention consists in the particular and specific means for accomplishing this result.

In the accompanying drawings illustrating a suitable embodiment of the invention:

Figure 1 is a plan view of a vaginal syringe constructed in accordance with the invention.

Fig. 2 is a longitudinal section of the same on the line 2—2 of Fig. 1.

Fig. 3 is a transverse section of the same on the line 3—3 of Figs. 1 and 2.

Fig. 4 is a detail transverse section on the line 4—4 of Figs. 1 and 2.

My said device comprises a tubular element 1 adapted to be coupled to one end of the hose of a douche bag and which at its discharge end is provided with a perforated head 2, for distributing water much in the manner of ordinary spray nozzles. The tube 1 is bent between its ends for purposes of convenience in a well known manner.

Rigidly mounted on the tube 1 between the bend therein and the head 2 is a collar 3 upon which there are pivotally mounted between their ends, four levers 4 and 5 respectively. The latter differ from the former in that they are provided with extension elements or thumb pieces 6 adapted to be digitally engaged for pivotally moving said levers. Slidably mounted on the tube 1, between the collar 3 and the bend therein, is a collar 7 having four pairs of lugs 8 for the reception of pivot pins 9 by means of which the links 10 are pivotally secured thereto, each of the latter being similarly pivotally secured to pairs of lugs 11 on the several levers 4 and 5. When the said levers are in the position shown in Figs. 1 and 2, viz: at one limit of their relative movement, the collar 7 will be positioned so that the links 10 extend angularly relatively to the straight portion of the tube or the axis of the collar 7. Pressure exerted on the thumb pieces 6 of the levers 5 will obviously cause the collar 7 to move toward the collar 3, whereby the links 10 connecting the levers 4 with said collar 7 will cause said levers 4 to move in unison with the levers 5. A compression spring 12 is interposed between the collars 3 and 7 for normally retaining the collar 7 and levers 4 and 5 in the position shown.

The foregoing structure constitutes no part of my present invention, which latter relates entirely to means for holding the collar 7 in any position to which it is moved toward the collar 3 as the levers 4 and 5 are turned on their pivots so that the vagina or any other orifice into which the device may be inserted may be maintained expanded for any desired period of time, thus adapting the device for use as a speculum as well as a syringe.

It will be noted by reference to Fig. 3 that the said levers 4 and 5 are made of channeled sheet metal so that there is room provided between the side flanges thereof at the point of their pivotal connection with the collar 3 for the insertion of an additional element. One end of a lever 13 is pivotally secured to the collar 3 between the flanges of one of the said levers, preferably a lever 4. The said lever 13 is provided between its ends with a ratchet-rack 14 and at its free end with a thumb piece 15 by means of which said lever may be moved pivotally, such movement being preferably accomplished by forcing said thumb piece 15 toward the opposed portion of the tube 1. A spring 16 is interposed between the free end portion of the lever 13 and the opposite portion of the tube 1 whereby said lever is held normally in position as shown in Fig. 2. The collar 7 is provided at a point between two of the pairs of ears or lugs 8 with a tooth 17 which is adapted to engage the rack 14 as said collar is moved against the action of the spring 12 for holding said collar against return movement under the influence of the spring 12 or the pressure exerted upon the end portions of the levers 4 and 5 effecting expansion of the vagina or other orifice. This enables the operator to effect expansion to whatever degree may be necessary whereupon the grip upon the thumb pieces 6 of the levers 5 may be released and the part maintained expanded without causing any inconvenience or tiring the hand in maintaining the same so expanded. When it is desired to release the device for the purpose of permitting the part expanded to contract, the operator need only press the thumb piece of the lever 13 toward the opposite portion of the tube 1 whereupon the tooth 17 will be disengaged from the rack 14 and the collar 7 thus permitted to return to its normal position. In order that the lever 13 may not be sprung laterally relatively to the tube 1, it is provided with a projection 17ª between its ends which, together with the opposed portion of the body of said lever, constitutes a yoke in which the tube is received for guiding the lever. It will be noted that by means of the specific construction and arrangement herein shown and described, perfect confidence of operation is effected and the general features of construction of the instrument are not disturbed. It will also be apparent that only smooth surfaces are exposed to contact with the hand whereby injury is obviated.

I claim as my invention:

1. A device of the kind specified comprising a tubular nozzle, a plurality of levers pivotally mounted thereon between their ends, a collar longitudinally movable on said tube, a plurality of links connecting said collar with the several levers for causing the latter to move in unison, a lever pivotally mounted at one end on said tube, a ratchet-rack on said lever between its ends, a tooth on said collar, a yoke on the lever between its ends forming a guide in which the tube is engaged to guide said lever, and a spring engaged with said lever and said tube for normally holding said rack and tooth engaged with each other.

2. A device of the kind specified comprising a tubular nozzle, a plurality of channeled levers pivotally mounted thereon between their ends and between the ends of said tube, a collar longitudinally movable on said tube, a plurality of links connecting said collar with the several levers for causing the latter to move in unison, a lever pivotally mounted at one end on said tube, coincidentally with one of said levers and in the channel thereof, said lever being bent to cause the free end thereof to become opposed to the tube at a point diametrically opposite its pivotal connection with the latter, a spring interposed between the last named end of said lever and said tube for holding the rack and tooth normally engaged, and a projection on said lever between its ends engaging the tube at a point diametrically opposite the portion of the lever crossing said tube, and coacting with the latter to form a guide yoke to prevent said lever from being sprung laterally.

FREDERICK W. STANTON.